United States Patent
Chen et al.

(10) Patent No.: US 12,397,762 B2
(45) Date of Patent: Aug. 26, 2025

(54) METHOD FOR DETERMINING VACUUM DEGREE THRESHOLD, AND MEDIUM, AND ELECTRONIC DEVICE

(71) Applicant: GREAT WALL MOTOR COMPANY LIMITED, Hebei (CN)

(72) Inventors: Wenlong Chen, Hebei (CN); Hao Zhang, Hebei (CN); Yanlong Geng, Hebei (CN); Yang Hao, Hebei (CN); Linxiao Wang, Hebei (CN)

(73) Assignee: GREAT WALL MOTOR COMPANY LIMITED, Hebei (CN)

( * ) Notice: Subject to any disclaimer, the term of this patent is extended or adjusted under 35 U.S.C. 154(b) by 374 days.

(21) Appl. No.: 18/010,299

(22) PCT Filed: Sep. 3, 2021

(86) PCT No.: PCT/CN2021/116479
§ 371 (c)(1),
(2) Date: Dec. 14, 2022

(87) PCT Pub. No.: WO2022/048644
PCT Pub. Date: Mar. 10, 2022

(65) Prior Publication Data
US 2023/0227015 A1 Jul. 20, 2023

(30) Foreign Application Priority Data
Sep. 3, 2020 (CN) .......................... 202010917252.6

(51) Int. Cl.
*B60T 13/00* (2006.01)
*B60T 13/52* (2006.01)
(Continued)

(52) U.S. Cl.
CPC .............. *B60T 13/52* (2013.01); *B60T 13/72* (2013.01); *B60T 17/221* (2013.01);
(Continued)

(58) Field of Classification Search
None
See application file for complete search history.

(56) References Cited

U.S. PATENT DOCUMENTS

2015/0037172 A1* 2/2015 Liddington ............. F04B 49/02
417/279

FOREIGN PATENT DOCUMENTS

| CN | 105966382 A | 9/2016 |
| CN | 107458364 A | 12/2017 |

(Continued)

OTHER PUBLICATIONS

International Search Report for PCT/CN2021/116479 issued Oct. 28, 2021.

*Primary Examiner* — Paul B Yanchus, III
(74) *Attorney, Agent, or Firm* — Schmeiser, Olsen & Watts LLP

(57) ABSTRACT

A method for determining a vacuum degree threshold is provided including: acquiring the current altitude signal of a vehicle; when the current altitude signal is invalid, acquiring a vacuum degree threshold and a standard working time, which correspond to a historical altitude signal received by an electronic vacuum pump of the vehicle last time, the vacuum degree threshold includes a vacuum degree turn-on threshold value and a vacuum degree turn-off threshold; acquiring the actual working time of the vacuum degree threshold corresponding to the historical altitude signal of the electronic vacuum pump when the current working cycle is completed; and when the difference between the actual working time and the standard working time exceeds a preset range, updating, according to the difference, the vacuum degree threshold corresponding to the historical altitude signal, and taking the updated vacuum degree threshold as a target vacuum degree threshold of the next working cycle.

20 Claims, 3 Drawing Sheets

(51) Int. Cl.
*B60T 13/72* (2006.01)
*B60T 17/22* (2006.01)
*F04B 49/06* (2006.01)
*F04B 49/08* (2006.01)
*F04C 25/02* (2006.01)

(52) U.S. Cl.
CPC ............ *F04B 49/065* (2013.01); *F04B 49/08* (2013.01); *F04C 25/02* (2013.01); *F04B 2205/01* (2013.01); *F04B 2207/00* (2013.01)

(56) References Cited

FOREIGN PATENT DOCUMENTS

| | | |
|---|---|---|
| CN | 111098839 A | 5/2020 |
| CN | 112158186 A | 1/2021 |
| EP | 2726351 A1 | 5/2014 |
| EP | 2964500 A1 | 1/2016 |
| EP | 2726351 B1 | 5/2018 |
| WO | 2014/135773 A1 | 9/2014 |

* cited by examiner

METHOD FOR DETERMINING VACUUM DEGREE THRESHOLD, AND MEDIUM, AND ELECTRONIC DEVICE

CROSS-REFERENCE TO RELATED APPLICATIONS

This application claims priority to PCT/CN2021/116479, having a filing date of Sep. 3, 2021, which is based on Chinese Patent Application No. 202010917252.6, having a filing date of Sep. 3, 2020, the entire contents both of which are hereby incorporated by reference.

FIELD OF TECHNOLOGY

The following relates to the field of vacuum pumps, and in particular, to a method and apparatus for determining vacuum degree threshold, and a medium, a program and an electronic device.

BACKGROUND

Electronic vacuum pumps are used as a brake booster in electric vehicles. The vacuum degree provided by the electronic vacuum pump affects the perception of the pedal, which in turn affects the system performance of the vehicle. When the vehicle travels at different altitudes, change in the external atmospheric pressure will affect the working time of the vacuum pump.

For example, under low atmospheric pressure, the vacuum pump may work for a long time to reach its shutdown threshold, which has an adverse effect on the service life of the vacuum pump. In order to avoid the influence of the change in the external atmospheric pressure on the vacuum pump, it is necessary to adjust the vacuum degree threshold of the vacuum pump according to the change of atmospheric pressure.

In the conventional technology, the altitude value is obtained through the positioning data of the Global Positioning System (GPS), and the corresponding external atmospheric pressure is determined according to the correlation between the altitude value and the atmospheric pressure, and then the vacuum degree threshold of the vacuum pump is adjusted according to the external atmospheric pressure. However, a more accurate vacuum degree threshold cannot be determined when the altitude value cannot be obtained.

SUMMARY

An aspect relates to a method for determining a vacuum degree threshold, so as to solve the technical problem in the conventional art that a relatively accurate vacuum degree threshold is unable to be determined.

A second aspect of the present disclosure provides an apparatus for determining a vacuum degree threshold.

A third aspect of the present disclosure provides a storage medium.

A fourth aspect of the present disclosure provides an electronic device.

In order to achieve the above proposals, the first aspect of the present disclosure provides a method for determining a vacuum degree threshold, which includes: obtaining a current altitude signal of a vehicle; obtaining a vacuum degree threshold and a standard working time corresponding to a historical altitude signal received by an electronic vacuum pump of the vehicle last time, if the current altitude signal is invalid, the vacuum degree threshold includes a vacuum degree turn-on threshold and a vacuum degree turn-off threshold, and the standard working time includes a predetermined working time of the electronic vacuum pump corresponding to the historical altitude signal; obtaining an actual working time to complete a current working cycle with the vacuum degree threshold corresponding to the historical altitude signal of the electronic vacuum pump; updating, when a difference between the actual working time and the standard working time exceeds a predetermined range, the vacuum degree threshold corresponding to the historical altitude signal according to the difference, and taking an updated vacuum degree threshold as a target vacuum degree threshold for a next working cycle.

According to an embodiment of the present disclosure, taking, when the difference between the actual working time and the standard working time does not exceed the predetermined range, the vacuum degree threshold corresponding to the historical altitude signal as the target vacuum degree threshold for the next working cycle.

According to an embodiment of the present disclosure, updating the vacuum degree threshold corresponding to the historical altitude signal according to the difference includes: updating altitude data corresponding to the historical altitude signal according to the difference value; and updating the vacuum degree threshold corresponding to the historical altitude signal according to updated altitude data.

According to an embodiment of the present disclosure, the difference includes a first difference value and a second difference value, the first difference value is a difference value between the actual working time and the standard working time, and the second difference value is a difference value between the standard working time and the actual working time. Updating altitude data corresponding to the historical altitude signal according to the difference includes: taking, when the first difference value is greater than or equal to a predetermined difference value threshold, a sum of the altitude data and a predetermined altitude change amount as the updated altitude data; taking, when the second difference value is greater than or equal to the predetermined difference value threshold, a difference between the altitude data and the predetermined altitude change amount as the updated altitude data.

According to an embodiment of the present disclosure, updating the vacuum degree threshold corresponding to the historical altitude signal according to the updated altitude data includes: obtaining an atmospheric pressure value corresponding to a target altitude data through a preset altitude correspondence, where the target altitude data includes the updated altitude data; calculating a ratio of the atmospheric pressure value to a standard atmospheric pressure value corresponding to the standard atmospheric pressure; updating the vacuum degree threshold corresponding to the historical altitude signal by using a product of the ratio and a standard vacuum degree threshold corresponding to the standard atmospheric pressure.

According to an embodiment of the present disclosure, taking, when the current altitude signal is valid, the vacuum degree threshold corresponding to the current altitude signal as the target vacuum degree threshold for the next working cycle.

According to an embodiment of the present disclosure, whether the current altitude signal is valid is determined by the following methods: obtaining a significant bit identifier corresponding to the current altitude signal; determining the current altitude signal is valid if the significant bit identifier indicates that the current altitude signal is valid; determining the current altitude signal is invalid if the significant bit identifier indicates that the current altitude signal is invalid.

The embodiment of the first aspect of the present disclosure provides a method for determining a vacuum degree threshold: if the altitude value is unable to be obtained, taking the vacuum degree threshold of the electronic vacuum pump at the time when the altitude signal is invalid as the vacuum degree threshold of the electronic vacuum pump in the current working cycle; obtaining an actual working time of the electronic vacuum pump in the current working cycle; determining the vacuum degree threshold for the next working cycle according to the difference value between the standard working time and the actual working time of the electronic vacuum pump. A more accurate vacuum degree threshold of the electronic vacuum pump can be determined when the altitude is unable to be obtained.

In order to achieve the above objectives, an embodiment of the second aspect of the present disclosure provides an apparatus for determining a vacuum degree threshold, including: a first acquisition module configured to acquire a current altitude signal of a vehicle; a second acquisition module configured to acquire, when the current altitude signal is invalid, a vacuum degree threshold and a standard working time corresponding to a historical altitude signal received by an electronic vacuum pump of the vehicle last time, where the vacuum degree threshold includes a vacuum degree turn-on threshold and a vacuum degree turn-off threshold, and the standard working time includes a predetermined working time of the electronic vacuum pump corresponding to the historical altitude signal; a third acquisition module configured to acquire an actual working time to complete a current working cycle with the vacuum degree threshold corresponding to the historical altitude signal of the electronic vacuum pump; and an update module configured to, when a difference between the actual working time and the standard working time exceeds a predetermined range, updating the vacuum degree threshold corresponding to the historical altitude signal according to the difference, and taking an updated vacuum degree threshold as a target vacuum degree threshold for a next working cycle.

An embodiment of the second aspect of the present disclosure provides an apparatus for determining a vacuum degree threshold. If the altitude value is unavailable, the vacuum degree threshold of the electronic vacuum pump at the time when the altitude signal is invalid is taken as the vacuum degree threshold of the electronic vacuum pump in the current working cycle; an actual working time of the electronic vacuum pump in the current working cycle is obtained; the vacuum degree threshold for the next working cycle is determined according to the difference between the standard working time and the actual working time of the electronic vacuum pump. A more accurate vacuum degree threshold of the electronic vacuum pump can be determined when the altitude is unable to be obtained.

In order to achieve the above objectives, an embodiment of a third aspect of the present disclosure provides a storage medium, which stores a computer program, when executed by a processor, implements the steps of the method for determining a vacuum degree threshold of the first aspect.

In order to achieve the above objectives, an embodiment of the fourth aspect of the present disclosure provides an electronic device, including:

a memory, on which a computer program is stored; and a processor for executing a computer program in the memory to implement the steps of the method for determining a vacuum degree threshold of the first aspect.

In order to achieve the above objectives, an embodiment of a fifth aspect of the present disclosure provides a computer program, including computer-readable codes, which, when the computer-readable codes are run on an electronic device, the electronic device executes the method for determining the vacuum degree threshold of the embodiment of the first aspect of the present disclosure.

Additional aspects and advantages of the present disclosure will be set forth, in part, from the following description, and in part will become apparent from the following description, or may be learned by practice of the disclosure.

BRIEF DESCRIPTION

Some of the embodiments will be described in detail, with references to the following Figures, wherein like designations denote like members, wherein.

DETAILED DESCRIPTION

Embodiments of the present disclosure are described in detail below, and examples of the embodiments are shown in the accompanying drawings, wherein the same or similar reference signs from beginning to end indicate the same or similar elements or elements having the same or similar functions. The embodiments described below by reference to the accompanying drawings are exemplary and are intended to explain the present disclosure and are not to be construed as limiting the present disclosure.

The method and apparatus for determining a vacuum degree threshold of embodiments of the present disclosure are described below with reference to the accompanying drawings.

Figure 1:
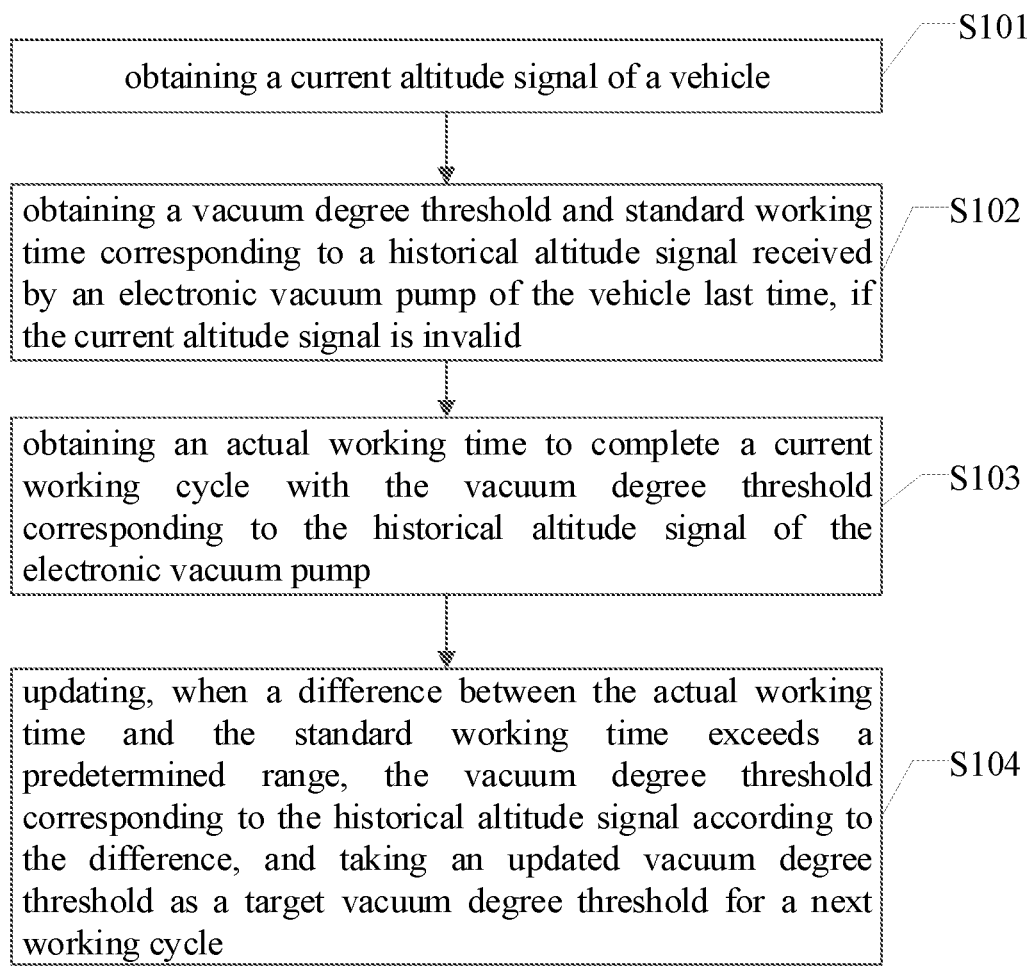
FIG. 1 is a flowchart showing a method for determining a vacuum degree threshold according to an exemplary embodiment.

FIG. 1 is a flowchart showing a method for determining a vacuum degree threshold according to an exemplary embodiment. As shown in FIG. 1, the method includes steps S101-S104:

In step S101: a current altitude signal of a vehicle is obtained.

The vehicle control unit (VCU) is the overall controller of the electric vehicle power system and is the core controller used to control the start, operation, forward and reverse, speed and stop of the electric vehicle as well as other electronic devices of the electric vehicle. The specific process for obtaining the current altitude signal of the vehicle is as follows: the VCU receives an altitude signal sent by GPS through the controller area network (CAN) bus, which includes the current latitude, longitude and altitude values of the vehicle.

In step S102: a vacuum degree threshold and standard working time corresponding to a historical altitude signal received by an electronic vacuum pump of the vehicle last time is obtained, if the current altitude signal is invalid.

The vacuum degree threshold includes the vacuum degree turn-on threshold and the vacuum degree turn-off threshold, and the standard working time includes a working time of the electronic vacuum pump corresponding to the preset historical altitude signal.

A significant bit identifier corresponding to the current altitude signal is obtained; the current altitude signal is determined to be valid if the significant bit identifier indicates that the current altitude signal is valid; the current altitude signal is determined to be invalid if the significant bit identifier indicates that the current altitude signal is invalid.

The VCU receives the altitude signal and altitude signal flag bit sent by GPS through the CAN bus. If the received altitude signal flag bit is valid, the altitude value in the received altitude signal is determined as the current altitude value by the VCU; and if the received altitude signal flag bit is invalid, the altitude signal is determined to be unavailable. When the VCU is powered off, the altitude value is stored in a non-volatile memory, and when the VCU is woken up, the altitude value stored before the power is off can be read.

Vacuum degree is the thinness of the gas under vacuum and is one of the main parameters of vacuum pump equipment. When the vacuum degree of the vacuum pump is greater than the vacuum degree turn-on threshold, the vacuum pump turns on and starts working, when the vacuum degree of the vacuum pump is less than the vacuum degree turn-off threshold, the vacuum pump turns off and stops working. The vacuum pump working time represents the time from turning on to turning off the vacuum pump. Table 1 shows an exemplary correspondence between the altitude value and the vacuum degree turn-on threshold of the vacuum pump, and Table 2 shows an exemplary correspondence between the altitude value and the vacuum degree turn-off threshold of the vacuum pump.

TABLE 1 correspondence between the altitude and the vacuum degree turn-on threshold

| Altitude (m) | 0 | 500 | 1000 | 1500 | 2000 | 2500 | 3000 | 3500 | 4000 | 4500 |
|---|---|---|---|---|---|---|---|---|---|---|
| Vacuum degree turn-on threshold (kPa) | −65 | −65 | −65 | −61.5 | −58 | −52.5 | −49 | −46 | −41 | −40 |

TABLE 2 correspondence between the altitude and the vacuum degree turn-off threshold

| Altitude (m) | 0 | 500 | 1000 | 1500 | 2000 | 2500 | 3000 | 3500 | 4000 | 4500 |
|---|---|---|---|---|---|---|---|---|---|---|
| Vacuum degree turn-off threshold (kPa) | −75 | −74 | −73 | −69 | −65 | −61 | −57 | −54 | −50 | −49 |

As shown in Table 1 and Table 2, the vacuum turn-on threshold and the vacuum turn-off threshold of the vacuum pump both increase as the altitude rises.

Table 3 shows an exemplary correspondence between the altitude value and the working time of the vacuum pump. As shown in Table 3, the working time of the vacuum pump varies at different altitude values, increasing as the altitude value rises.

The data in Table 1, Table 2 and Table 3 of this disclosure are exemplary, and the specific data are calibrated values, which can be calibrated according to a specific vacuum pump product. For example, the vacuum degree turn-on threshold, the vacuum degree turn-off threshold and the vacuum pump working time at each altitude can be measured and calibrated before each model of vacuum pump leaves the factory. In this regard, embodiments of the present invention are not specifically limited.

The altitude value may change when the vehicle travels. When the altitude information of the vehicle is valid, the VCU determines a real-time vacuum threshold value of the vehicle according to the altitude value obtained in real time. The vacuum degree threshold corresponding to the historical altitude signal refers to the vacuum degree threshold corresponding to an altitude value in the vehicle altitude signal received at the moment before the vehicle altitude signal is invalid, and the standard working time refers to the time from turning on to turning off the electronic vacuum pump when operating according to the corresponding vacuum degree threshold under the altitude value in the historical altitude signal.

For example, when the altitude signal is invalid, the altitude value at the moment before the altitude signal is invalid is acquired by the VCU, and a vacuum degree turn-on threshold Pon and a vacuum degree turn-off threshold Poff of the vacuum pump under the altitude value are obtained according to the correspondence between the altitude value and the vacuum thresholds (e.g. Table 1 and Table 2), and the working time T (i.e. standard working time) of the vacuum pump from turning on to turning off under the altitude value is obtained according to the correspondence between the altitude value and the vacuum pump working time (e.g. Table 3).

TABLE 3 correspondence between the altitude and the working time of the vacuum pump

| Altitude (m) | 0 | 500 | 1000 | 1500 | 2000 | 2500 | 3000 | 3500 | 4000 | 4500 |
|---|---|---|---|---|---|---|---|---|---|---|
| Working time of the vacuum pump (s) | 3.1 | 3.2 | 3.5 | 3.6 | 4.0 | 4.3 | 5.6 | 6.2 | 7.0 | 7.4 |

In step S103: an actual working time to complete a current working cycle with the vacuum degree threshold corresponding to the historical altitude signal of the electronic vacuum pump is obtained.

When the altitude signal is invalid, the altitude value at the moment before the altitude signal is invalid is acquired by the VCU, and the vacuum degree turn-on threshold Pon and vacuum degree turn-off threshold Poff of the vacuum pump at that altitude value are obtained, and the vacuum degree turn-on threshold Pon and vacuum degree turn-off threshold Poff are taken as the vacuum degree turn-on threshold and vacuum degree turn-off threshold for a current working cycle. The vacuum degree turn-on threshold for the current working cycle Pon1=Pon and the vacuum degree turn-off threshold for the current working cycle Poff1=Poff. The current working cycle refers to a working cycle of the vacuum pump from turning on to turning off at the current altitude. The actual working time refers to the working time t1 of the vacuum pump from turning on to turning off according to Pon1 and Poff1 under the current real altitude value.

S104: when a difference between the actual working time and the standard working time exceeds a predetermined range, the vacuum degree threshold corresponding to the historical altitude signal is updated according to the difference value, and an updated vacuum degree threshold is taken as a target vacuum degree threshold for a next working cycle.

In one possible implementation, the difference between the actual working time and the standard working time may be obtained by calculating the value of t1-T or the value of T-t1. Since the vacuum degree turn-on threshold and vacuum degree turn-off threshold for the current time period and the previous time period are the same, therefore, when the difference between the actual working time and the standard working time exceeds the predetermined range, the difference between the current altitude value and the altitude value of the previous moment is relatively large and the vacuum degree thresholds at different altitudes are different. At this time, the vacuum degree threshold is updated according to the difference value, either by lowering the vacuum degree threshold of the vacuum pump or by raising the vacuum degree threshold of the vacuum pump, and taking the updated vacuum degree threshold as the target vacuum degree threshold for the next working cycle.

Updating the vacuum degree threshold corresponding to the historical altitude signal according to the difference value in step S104 includes: updating the altitude data corresponding to the historical altitude signal according to the difference value; updating the vacuum degree threshold corresponding to the historical altitude signal according to the updated altitude data.

Since the vacuum degree turn-on threshold and vacuum degree turn-off threshold for the current time period and the previous time period are the same, therefore, when the difference between the actual working time and the standard working time exceeds the predetermined range, the difference between the current altitude value and the altitude value of the previous moment is relatively large, and the updated vacuum degree threshold value is determined according to the updated altitude value.

In step S104, the difference value includes a first difference value and a second difference value, the first difference value is the difference value between the actual working time and the standard working time, and the second difference value is the difference value between the standard working time and the actual working time. Updating the altitude data corresponding to the historical altitude signal according to the difference value includes: taking a sum of the altitude data and a predetermined altitude change amount as the updated altitude data, when the first difference value is greater than or equal to a predetermined difference value threshold; taking a difference between the altitude data and the predetermined altitude change amount as the updated altitude data, when the second difference is greater than or equal to the predetermined difference value threshold.

For example, the value of T1-T may be the first difference value, and the value of T-T1 may be the second difference value. $\Delta t$ is the predetermined difference value threshold, and an initial value of $\Delta t$ may be a calibrated amount, for example, it may be 0.2 s, which can be calibrated according to the specific vacuum pump product. The accuracy of the target vacuum degree threshold determined for the next working cycle becomes lower when $\Delta t$ is set longer. The predetermined altitude change amount refers to the amount of altitude change each time. The predetermined altitude change amount corresponding to a predetermined difference value of 0.2 s may be preset to 200 m. That is, the altitude value is adjusted by 200 m when the first difference value or the second difference value is greater than $\Delta t$ of 0.2 s. Specifically, a value of T1-T greater than $\Delta t$ indicates that the actual working time is longer than the standard working time, thus it can be obtained from the table of the predetermined correspondence that the working time of the vacuum pump becomes longer with an increased altitude. Therefore, the altitude change amount may be added to the altitude data corresponding to the historical altitude signal. For example, taking the above Table 1, Table 2 and Table 3 as an example, when the altitude data corresponding to the historical altitude signal is 1000 m, after the altitude signal is invalid, a vacuum degree turn-on threshold of −65 kPa, a vacuum degree turn-off threshold of −73 kPa, and a standard working time of 3.5 s of the vacuum pump at the altitude of 1000 m are obtained according to the above Table 1, Table 2 and Table 3; the value of the actual working time T1 of the vacuum pump is recorded as 3.8 s when the vacuum pump operates according to the vacuum degree turn-on threshold of −65 kPa and the vacuum degree turn-off threshold of −73 kPa, hence the value of T1-T is 0.3 s, which is greater than the initial value of $\Delta t$, 0.2 s; and additional 200 m is added to the original altitude of 1000 m to estimate the altitude value for the next working time period, and the vacuum degree thresholds corresponding to this altitude value of 1200 m are obtained; the obtained vacuum degree threshold is taken as the vacuum degree threshold for the next working cycle. When obtaining the vacuum degree threshold according to the altitude value, the vacuum degree threshold may be obtained from the table of correspondence between the altitude value and the vacuum degree, and may also be calculated as follows.

In the step S104, updating the vacuum degree threshold corresponding to the historical altitude signal according to the updated altitude data includes: obtaining an atmospheric pressure value corresponding to a target altitude data through a predetermined altitude correspondence, where the target altitude data includes the updated altitude data; calculating a ratio of the atmospheric pressure value to the standard atmospheric pressure value corresponding to the standard atmospheric pressure; and updating the vacuum degree threshold corresponding to the historical altitude signal by using the product of the ratio and a standard vacuum degree threshold corresponding to the standard atmospheric pressure.

For example, the vacuum degree threshold of the vacuum pump may be obtained through the equation:

$$\frac{P_1}{P_0} = \frac{A}{B},$$

where Pi is the atmospheric pressure value of the environment corresponding to the updated altitude data, Po is the standard atmospheric pressure value at an altitude of 0, A is the vacuum degree threshold of the vacuum pump at the current atmospheric pressure, and B is the vacuum degree threshold of the vacuum pump at the standard atmospheric pressure. The current vacuum degree threshold is calculated according to the above equation, and the vacuum degree threshold corresponding to the historical altitude information is updated according to the current vacuum degree threshold.

Figure 2:
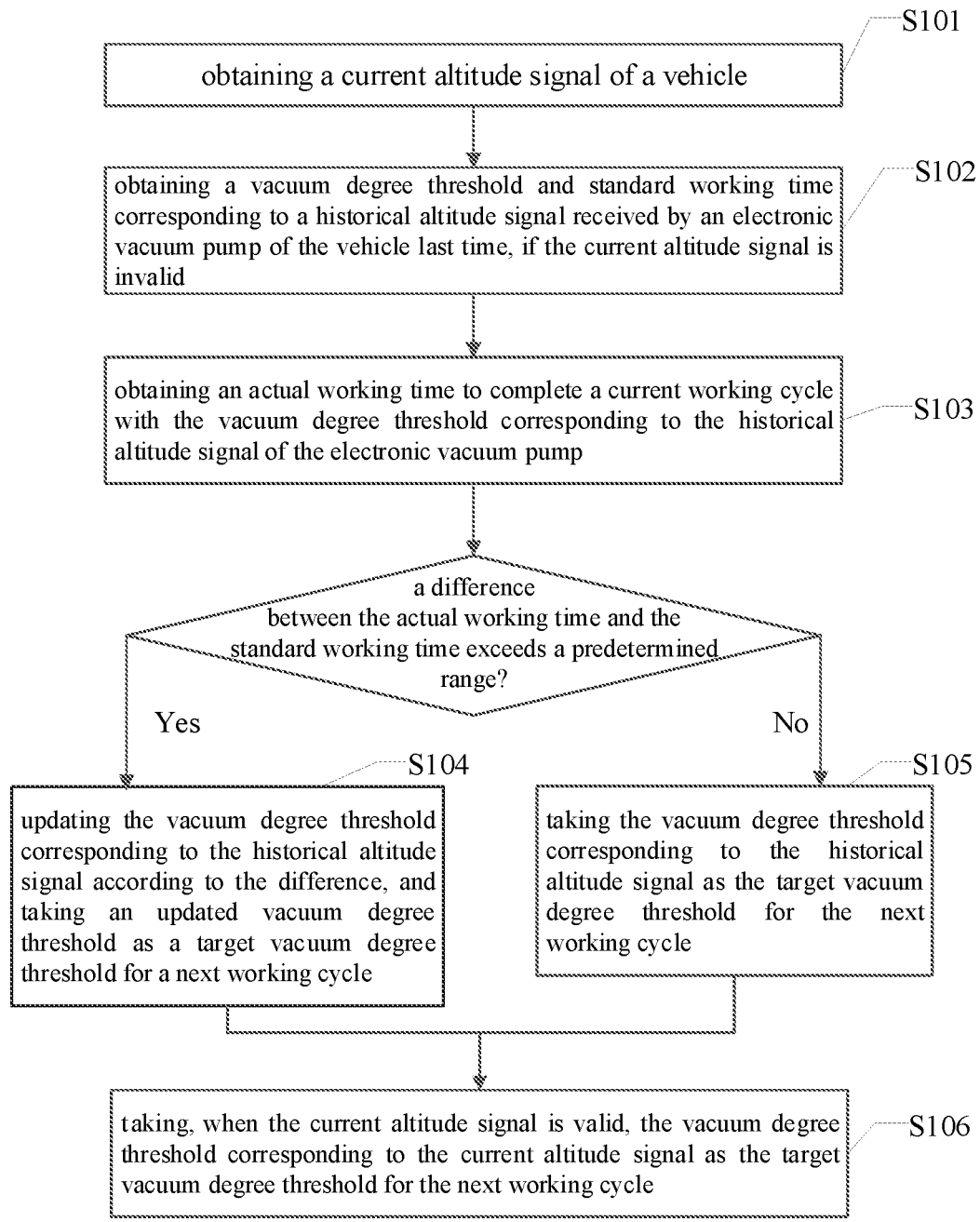
FIG. 2 is a flowchart showing another method for determining a vacuum degree threshold according to an exemplary embodiment.

As shown in FIG. 2, in the above method for determining the vacuum degree threshold, the method also includes step S105: when the difference between the actual working time and the standard working time does not exceed the predetermined range, the vacuum degree threshold corresponding to the historical altitude signal is taken as the target vacuum degree threshold for the next working cycle.

When the difference between the actual working time and the standard working time does not exceed the predetermined range, the deviation of the current altitude value from the previous altitude value is not significant, and the previous altitude value can still be used as the next altitude value.

In the second next working cycle, the actual working time and the standard working time are continued to be collected, so as to estimate the actual altitude value and obtain the corresponding vacuum degree threshold. For example, assuming a vacuum degree turn-on threshold Pon2, a vacuum degree turn-off threshold Poff2 and a standard working time T2 for the vacuum pump in the next working cycle, the actual working time t2 of the vacuum pump in the next working cycle is obtained, and the altitude value is updated according to a difference between T2 and t2, and then the vacuum degree turn-on threshold and vacuum degree turn-off threshold of the vacuum pump in the second next working cycle are obtained according to the updated altitude value. When the altitude signal is unavailable, the altitude value is updated several times using the above-mentioned method, and the predicted altitude value is closer to the real value through successive approximation, so that a more accurate vacuum degree threshold of the vacuum pump can be determined.

Through the above method, when the altitude value is unable to be obtained, the vacuum degree threshold of the electronic vacuum pump when the altitude signal is invalid is used as the vacuum degree threshold of the electronic vacuum pump in the current working cycle, and the actual working time of the electronic vacuum pump is obtained, and then the vacuum degree threshold of the next working cycle is determined according to the difference between the standard working time and the actual time working time. Therefore, a more accurate vacuum degree threshold of the electronic vacuum pump can be determined when the altitude is unavailable.

FIG. 2 is a flowchart showing another method for determining a vacuum degree threshold according to an exemplary embodiment. As shown in FIG. 2, the following step is further included in the flowchart based on FIG. 1:

In step S106: when the current altitude signal is valid, the vacuum degree threshold corresponding to the current altitude signal is taken as the target vacuum degree threshold for the next working cycle.

After the altitude signal is unavailable, the vacuum degree threshold is determined according to the estimated altitude value, and when the altitude information is restored, a corresponding vacuum degree threshold is determined according to the real-time altitude value in the altitude signal.

Through the above method, when the altitude value is unable to be obtained, the vacuum degree threshold of the electronic vacuum pump when the altitude signal is invalid is used as the vacuum degree threshold of the electronic vacuum pump in the current working cycle, and the actual working time of the electronic vacuum pump is obtained, and then the vacuum degree threshold of the next working cycle is determined according to the difference between the standard working time and the actual time working time. Therefore, a relatively accurate vacuum degree threshold of the electronic vacuum pump can be determined when the altitude is unavailable.

Based on the same inventive idea, as an implementation of the above method, an embodiment of the present disclosure provides an apparatus for determining the vacuum degree threshold, which corresponds to the aforementioned method embodiment, for the convenience of reading, the details of the aforementioned method embodiment will not be repeated in the apparatus embodiment, but it should be understood that the apparatus in this embodiment implements all the contents corresponding to the aforementioned method embodiment.

Figure 3:
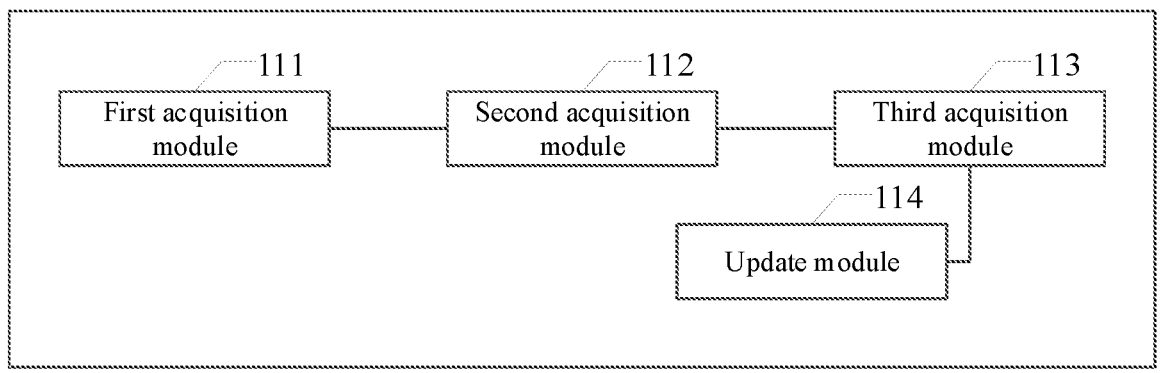
FIG. 3 is a block diagram of an apparatus for determining a vacuum degree threshold according to an exemplary embodiment.

FIG. 3 is a block diagram of an apparatus for determining a vacuum degree threshold according to an exemplary embodiment, for application to a policy management server. As shown in FIG. 3, the apparatus 110 provided in the present embodiment includes:

a first acquisition module 111 configured to acquire a current altitude signal of a vehicle.

a second acquisition module 112 configured to acquire a vacuum degree threshold and a standard working time corresponding to a historical altitude signal received by an electronic vacuum pump of the vehicle last time when the current altitude signal is invalid, where the vacuum degree threshold includes a vacuum degree turn-on threshold and a vacuum degree turn-off threshold, and the standard working time includes a working time of the electronic vacuum pump corresponding to the predetermined historical altitude signal;

a third acquisition module 113 configured to acquire an actual working time of the electronic vacuum pump to complete a current working cycle with the vacuum degree threshold corresponding to the historical altitude signal; and an update module 114 configured to, when a difference between the actual working time and the standard working time exceeds a predetermined range, updating the vacuum degree threshold corresponding to the historical altitude signal according to the difference value, and taking an updated vacuum degree threshold as a target vacuum degree threshold for a next working cycle.

Optionally, when the difference between the actual working time and the standard working time does not exceed the predetermined range, the vacuum degree threshold corresponding to the historical altitude signal is used as the target vacuum degree threshold for the next working cycle.

Optionally, updating the vacuum degree threshold corresponding to the historical altitude signal according to the difference value includes: updating altitude data corresponding to the historical altitude signal according to the difference value; and updating the vacuum degree threshold corresponding to the historical altitude signal according to updated altitude data.

Optionally, the difference value includes a first difference value and a second difference value, the first difference value is the difference value between the actual working time and the standard working time, and the second difference value is the difference value between the standard working time and the actual working time. Updating the altitude data corresponding to the historical altitude signal according to the difference value includes: taking, when the first difference value is greater than or equal to a predetermined difference value threshold, a sum of the altitude data and a predetermined altitude change amount as the updated altitude data; taking, when the second difference value is greater than or equal to the predetermined difference value threshold, a difference between the altitude data and the predetermined altitude change amount as the updated altitude data.

Optionally, updating the vacuum degree threshold corresponding to the historical altitude signal according to the updated altitude data includes: obtaining an atmospheric pressure value corresponding to a target altitude data through a predetermined altitude correspondence, where the target altitude data includes the updated altitude data; calculating a ratio of the atmospheric pressure value to a standard atmospheric pressure value corresponding to the standard atmospheric pressure; updating the vacuum degree threshold corresponding to the historical altitude signal by using a product of the ratio and the standard vacuum degree threshold corresponding to the standard atmospheric pressure.

Optionally, taking, when the current altitude signal is valid, the vacuum degree threshold corresponding to the current altitude signal as the target vacuum degree threshold for the next working cycle.

Optionally, whether the current altitude signal is valid is determined by the following methods: obtaining a significant bit identifier corresponding to the current altitude signal; the current altitude signal is determined to be valid if the significant bit identifier indicates that the current altitude signal is valid; the current altitude signal is determined to be invalid if the significant bit identifier indicates that the current altitude signal is invalid.

Through the above method, when the altitude value is unable to be obtained, the vacuum degree threshold of the electronic vacuum pump when the altitude signal is invalid is used as the vacuum degree threshold of the electronic vacuum pump in the current working cycle, and the actual working time of the electronic vacuum pump is obtained, and then the vacuum degree threshold of the next working cycle is determined according to the difference between the standard working time and the actual time working time. Therefore, a relatively accurate vacuum degree threshold of the electronic vacuum pump can be determined when the altitude is unavailable.

Regarding the apparatus in the above-mentioned embodiment, the specific manner in which each module operates has been described in detail in the embodiment of the method, and will not be described in detail herein.

Figure 4:
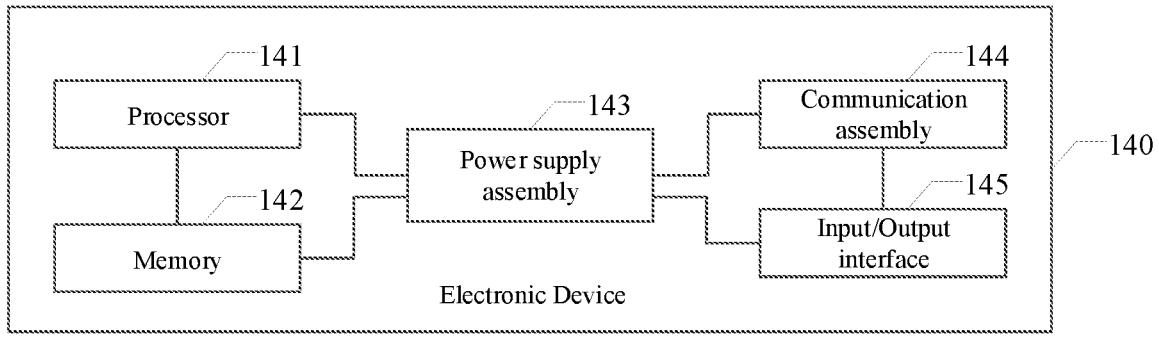
FIG. 4 is a block diagram of an electronic device according to an exemplary embodiment.

FIG. 4 is a block diagram of an electronic device 140 of an exemplary embodiment. For example, the electronic device 140 may be provided as a server. Referring to FIG. 4, the electronic device 140 includes one or more processors 141, and a memory 142 for storing a computer program executable by the one or more processor 141. The computer program stored in memory 142 may include one or more modules, each corresponding to a set of instructions. Furthermore, the processor 141 may be configured to execute the computer program to perform the above-described method for determining the vacuum degree threshold.

In addition, the electronic device 140 may further include a power supply assembly 143, which may be configured to perform power management of the electronic device 140, and a communication assembly 144, which may be configured to enable communication, for example, a wired or wireless communication, of the electronic device 140. Additionally, the electronic device 140 may also include an input/output (I/O) interface 145. The electronic device 140 may operate an operating system stored in memory 142, such as Windows Server™, Mac OS X™, Unix™, Linux™, and the like.

In another exemplary embodiment, provided is a computer storage medium including a program instruction, the program instruction, when executed by a processor, implements the above-mentioned method for determining a vacuum degree threshold.

In another exemplary embodiment, provided is a computer program product (non-transitory computer readable storage medium having instructions, which when executed by a processor, perform actions) including a computer program executable by a programmable apparatus, the computer program has a code portion, when executed by the programmable apparatus, for performing the above-mentioned method for determining the vacuum degree threshold.

The embodiments of the present disclosure have been described above in detail with reference to the accompanying drawings. However, the present disclosure is not limited to the specific details of the above-mentioned embodiments. Various simple modifications can be made to the technical proposals of the present disclosure within the scope of the technical concept of the present disclosure. These modifications all fall within the protection scope of the present disclosure.

In order to implement the above-mentioned embodiments, the present disclosure also provides a computer program, including computer-readable codes, when the computer-readable codes are executed on an electronic device, causing the electronic device to execute the aforementioned method for determining a vacuum degree threshold.

In the description of this specification, description with reference to the terms "one embodiment," "some embodiments," "example," "specific example," or "some examples", etc., mean specific features, structures, materials, or characteristics described in connection with the embodiment or example, are included in at least one embodiment or example of the present disclosure. In this specification, schematic representations of the above terms are not necessarily directed to the same embodiment or example. Furthermore, the specific features, structures, materials or characteristics described may be combined in any suitable manner in any one or more embodiments or examples. Furthermore, those skilled in the art may combine the different embodiments or examples described in this specification, as well as the features of the different embodiments or examples, without conflicting each other.

In addition, the terms "first" and "second" are merely used for descriptive purposes, and should not be construed as indicating or implying relative importance or implying the number of indicated technical features. Thus, a feature with "first", "second" may expressly or implicitly include at least one of that feature. In the description of the present disclosure, "plurality" means at least two, such as two, three, etc., unless expressly and specifically defined otherwise.

Any process or method description in the flowcharts or otherwise described herein may be understood to represent a module, segment or portion of code including one or more executable instructions for implementing custom logical functions or steps of the process, and the scope of the embodiments of the present disclosure includes alternative implementations in which the functions may be performed out of the order shown or discussed, including performing the functions substantially concurrently or in the reverse order depending upon the functions involved, which should be understood by those skilled in the art to which the embodiments of the present disclosure pertain.

The logic and/or steps represented in flowcharts or otherwise described herein, for example, may be considered an ordered listing of executable instructions for implementing the logical functions, may be embodied in any computer-readable medium, for use with, or in conjunction with, an instruction execution system, apparatus, or device (such as a computer-based system, a system including a processor, or other system that can fetch instructions from and execute instructions from an instruction execution system, apparatus, or device). For the purposes of this specification, a "computer readable medium" may be any device that can contain, store, communicate, propagate, or transmit a program for use with, or in conjunction with, an instruction execution system, apparatus, or device. More specific examples of computer-readable media (a non-exhaustive list) include the following: electrically connected sections with one or more wiring (electronic devices), portable computer disk cartridges (magnetic devices), random access memory (RAM), read-only memory (ROM), erasable editable read-only memory (EPROM or flash memory), fiber optic devices, and portable compact disc read-only memory (CDROM). Alternatively, the computer readable medium may even be a paper or other suitable medium on which the program can be printed, since the program can be obtained electronically, for example, by optical scanning of the paper or other medium, followed by editing, decoding or, if necessary, processing in other suitable ways, and then storing it in computer memory.

It should be understood that the various parts of the present disclosure may be implemented with hardware, software, firmware, or a combination thereof. In the above embodiments, multiple steps or methods may be implemented with software or firmware stored in memory and executed by a suitable instruction execution system. For example, if implemented in hardware as in another implementation, any of the following techniques known in the art or a combination thereof may be used: discrete logic circuits with logic gates for implementing logic functions on data signals, specialized integrated circuits with suitable combinations of logic gates, programmable gate arrays (PGA), field programmable gate arrays (FPGA), etc.

Those of ordinary skill in the art can understand that all or some of the steps carried out to implement the method of the above embodiment can be accomplished by instructing the relevant hardware by a program, the program can be stored in a computer readable storage medium which, when executed, comprises one of the steps of the method embodiment or a combination thereof.

In addition, each functional unit in various embodiments of the present disclosure may be integrated in a processing module, or the individual units may be physically present separately, or two or more units may be integrated in a single module. The aforementioned integrated modules can be implemented either in the form of hardware or in the form of software functional modules. The aforementioned integrated modules may also be stored in a computer readable storage medium if they are implemented in the form of software function modules and sold or used as standalone products.

Although the present invention has been disclosed in the form of embodiments and variations thereon, it will be understood that numerous additional modifications and variations could be made thereto without departing from the scope of the invention.

For the sake of clarity, it is to be understood that the use of 'a' or 'an' throughout this application does not exclude a plurality, and 'comprising' does not exclude other steps or elements.

What is claimed is:

1. A method for determining a vacuum degree threshold, comprising:
   obtaining a current altitude signal of a vehicle by a vehicle controller unit;
   obtaining, if the current altitude signal is invalid, the vacuum degree threshold and a standard working time of an electronic vacuum pump of the vehicle corresponding to a historical altitude signal received by the VCU last time, the vacuum degree threshold comprising a vacuum degree turn-on threshold and a vacuum degree turn-off threshold, and the standard working time comprising a predetermined working time of the electronic vacuum pump corresponding to the historical altitude signal;
   obtaining an actual working time of the electronic vacuum pump to complete a current working cycle with the vacuum degree threshold corresponding to the historical altitude signal; and
   updating, when a difference between the actual working time and the standard working time exceeds a predetermined range, the vacuum degree threshold corresponding to the historical altitude signal according to the difference, and taking an updated vacuum degree threshold as a target vacuum degree threshold for a next working cycle.

2. The method according to claim 1, further comprising:
   taking, when the difference between the actual working time and the standard working time does not exceed the predetermined range, the vacuum degree threshold corresponding to the historical altitude signal as the target vacuum degree threshold for the next working cycle.

3. The method according to claim 1, wherein the step of updating the vacuum degree threshold corresponding to the historical altitude signal according to the difference comprises:
   updating altitude data corresponding to the historical altitude signal according to the difference; and
   updating the vacuum degree threshold corresponding to the historical altitude signal according to updated altitude data.

4. The method according to claim 3, wherein the difference comprises a first difference value and a second difference value, the first difference value is a difference value between the actual working time and the standard working time, and the second difference value is a difference value between the standard working time and the actual working time; the step of updating altitude data corresponding to the historical altitude signal according to the difference comprises:

taking, when the first difference value is greater than or equal to a predetermined difference value threshold, a sum of the altitude data and a predetermined altitude change amount as the updated altitude data; and taking, when the second difference value is greater than or equal to the predetermined difference value threshold, a difference between the altitude data and the predetermined altitude change amount as the updated altitude data.

5. The method according to claim 3, wherein the step of updating the vacuum degree threshold corresponding to the historical altitude signal according to the updated altitude data comprises:

obtaining an atmospheric pressure value corresponding to a target altitude data through a preset altitude correspondence, wherein the target altitude data comprises the updated altitude data;

calculating a ratio of the atmospheric pressure value to a standard atmospheric pressure value corresponding to the standard atmospheric pressure; and updating the vacuum degree threshold corresponding to the historical altitude signal by using a product of the ratio and a standard vacuum degree threshold corresponding to the standard atmospheric pressure.

6. The method according to claim 1, further comprising: taking, when the current altitude signal is valid, the vacuum degree threshold corresponding to the current altitude signal as the target vacuum degree threshold for the next working cycle.

7. The method according to claim 5, wherein whether the current altitude signal is valid is determined by:

obtaining a significant bit identifier corresponding to the current altitude signal;

determining the current altitude signal to be valid, if the significant bit identifier indicates that the current altitude signal is valid; and determining the current altitude signal to be invalid, if the significant bit identifier indicates that the current altitude signal is invalid.

8. The method according to claim 2, further comprising: taking, when the current altitude signal is valid, the vacuum degree threshold corresponding to the current altitude signal as the target vacuum degree threshold for the next working cycle.

9. The method according to claim 3, further comprising: taking, when the current altitude signal is valid, the vacuum degree threshold corresponding to the current altitude signal as the target vacuum degree threshold for the next working cycle.

10. The method according to claim 4, further comprising: taking, when the current altitude signal is valid, the vacuum degree threshold corresponding to the current altitude signal as the target vacuum degree threshold for the next working cycle.

11. The method according to claim 5, further comprising: taking, when the current altitude signal is valid, the vacuum degree threshold corresponding to the current altitude signal as the target vacuum degree threshold for the next working cycle.

12. A non-transitory computer storage medium on which a computer program is stored, wherein the program, when executed by a processor, implements a method comprising:

obtaining a current altitude signal of a vehicle by a vehicle controller unit;

obtaining, if the current altitude signal is invalid, a vacuum degree threshold and a standard working time of an electronic vacuum pump of the vehicle corresponding to a historical altitude signal received by the VCU last time, the vacuum degree threshold comprising a vacuum degree turn-on threshold and a vacuum degree turn-off threshold, and the standard working time comprising a predetermined working time of the electronic vacuum pump corresponding to the historical altitude signal;

obtaining an actual working time of the electronic vacuum pump to complete a current working cycle with the vacuum degree threshold corresponding to the historical altitude signal; and updating, when a difference between the actual working time exceeds a predetermined range, the vacuum degree threshold corresponding to the historical altitude signal according to the difference, and taking an updated vacuum degree threshold as a target vacuum degree threshold for a next working cycle.

13. The non-transitory computer storage medium according to claim 12, wherein the method further comprises:

taking, when the difference between the actual working time and the standard working time does not exceed the predetermined range, the vacuum degree threshold corresponding to the historical altitude signal as the target vacuum degree threshold for the next working cycle.

14. The non-transitory computer storage medium according to claim 12, wherein the step of updating the vacuum degree threshold corresponding to the historical altitude signal according to the difference comprises:

updating altitude data corresponding to the historical altitude signal according to the difference; and updating the vacuum degree threshold corresponding to the historical altitude signal according to updated altitude data.

15. The non-transitory computer storage medium according to claim 14, wherein the difference comprises a first difference value and a second difference value, the first difference value is a difference value between the actual working time and the standard working time, and the second difference value is a difference value between the standard working time and the actual working time; the step of updating altitude data corresponding to the historical altitude signal according to the difference comprising:

taking, when the first difference value is greater than or equal to a predetermined difference value threshold, a sum of the altitude data and a predetermined altitude change amount as the updated altitude data; and taking, when the second difference value is greater than or equal to the predetermined difference value threshold, a difference between the altitude data and the predetermined altitude change amount as the updated altitude data.

16. The non-transitory computer storage medium according to claim 14, wherein the step of updating the vacuum degree threshold corresponding to the historical altitude signal according to the updated altitude data comprises:

obtaining an atmospheric pressure value corresponding to a target altitude data through a preset altitude correspondence, wherein the target altitude data comprises the updated altitude data;

calculating a ratio of the atmospheric pressure value to a standard atmospheric pressure value corresponding to the standard atmospheric pressure; and updating the vacuum degree threshold corresponding to the historical altitude signal by using a product of the ratio and a standard vacuum degree threshold corresponding to the standard atmospheric pressure.

17. The non-transitory computer storage medium according to claim 12, wherein the method further comprises:

taking, when the current altitude signal is valid, the vacuum degree threshold corresponding to the current altitude signal as the target vacuum degree threshold for the next working cycle.

18. The non-transitory computer storage medium according to claim 17, wherein the method further comprises:

taking, when the current altitude signal is valid, the vacuum degree threshold corresponding to the current altitude signal as the target vacuum degree threshold for the next working cycle.

19. The non-transitory computer storage medium according to claim 16, wherein whether the current altitude signal is valid is determined by:

obtaining a significant bit identifier corresponding to the current altitude signal;

determining the current altitude signal to be valid, if the significant bit identifier indicates that the current altitude signal is valid; and determining the current altitude signal to be invalid, if the significant bit identifier indicates that the current altitude signal is invalid.

20. An electronic device, comprising:

a memory, on which a computer program is stored; and a processor configured to execute a computer program in the memory to implement a method comprising;

obtaining a current altitude signal of a vehicle by a vehicle controller unit;

obtaining, if the current altitude signal is invalid, a vacuum degree threshold and a standard working time of an electronic vacuum pump of the vehicle corresponding to a historical altitude signal received by the VCU last time, the vacuum degree threshold comprising a vacuum degree turn-on threshold and a vacuum degree turn-off threshold, and the standard working time comprising a predetermined working time of the electronic vacuum pump corresponding to the historical altitude signal;

obtaining an actual working time of the electronic vacuum pump to complete a current working cycle with the vacuum degree threshold corresponding to the historical altitude signal, and updating, when a difference between the actual working time exceeds a predetermined range, the vacuum degree threshold corresponding to the historical altitude signal according to the difference, and taking an updated vacuum degree threshold as a target vacuum degree threshold for a next working cycle.

* * * * *